US00RE50152E

(19) United States
(12) Reissued Patent
Frost et al.

(10) Patent Number: US RE50,152 E
(45) Date of Reissued Patent: Oct. 1, 2024

(54) MODULAR SCREED PLATE ASSEMBLY AND METHOD OF ASSEMBLING A SCREED PLATE

(71) Applicant: Axenox, LLC., Powell, WY (US)

(72) Inventors: Stuart Anthony Frost, Cowley, WY (US); David Michael Frost, Jr., Cowley, WY (US)

(73) Assignee: AXENOX, LLC., Powell, WY (US)

(21) Appl. No.: 17/091,517

(22) Filed: Nov. 6, 2020

Related U.S. Patent Documents

Reissue of:
(64) Patent No.: 10,156,049
Issued: Dec. 18, 2018
Appl. No.: 16/113,203
Filed: Aug. 27, 2018

(51) Int. Cl.
*E01C 19/42* (2006.01)
*E01C 19/48* (2006.01)

(52) U.S. Cl.
CPC ..... *E01C 19/42* (2013.01); *E01C 19/48* (2013.01); *E01C 19/4873* (2013.01); *E01C 2301/10* (2013.01); *E01C 2301/14* (2013.01)

(58) Field of Classification Search
CPC ..... E01C 19/42; E01C 19/48; E01C 2301/10; E01C 19/4873; E01C 19/4866; E01C 2301/14; E01C 2301/16
See application file for complete search history.

(56) References Cited

U.S. PATENT DOCUMENTS 1,780,427 A * 11/1930 Kirkham ..... E01C 19/42 404/119
2,299,700 A * 10/1942 Millikin ..... E01C 19/42 404/120
5,397,199 A 3/1995 Frampton et al.
5,417,516 A 5/1995 Birtchet
5,702,202 A * 12/1997 Schleiter ..... E01C 19/40 404/104
6,074,129 A 6/2000 Nowak et al.
6,238,135 B1 5/2001 Rower
6,520,715 B1 * 2/2003 Smith ..... E01C 19/48 404/75

(Continued)

FOREIGN PATENT DOCUMENTS

CN 102037184 B 7/2013
EP 0663974 B1 9/1998
WO 9504859 A1 2/1995

*Primary Examiner* — Terrence R Till
(74) *Attorney, Agent, or Firm* — ArentFox Schiff LLP

(57) ABSTRACT

The modular screed plate assembly and method has a road paver/finisher, a structural/conductor plate and modular screed plates. The road paver/finisher has a paver under side, a power source and a heating element, for heating the modular screed plates. The modular screed plates have coupling elements, and retainer quick-connect/releases, and align as a modular screed plate array, providing a tensionally yielding gap allowing the modular screed plate array to absorb pressures from paving operations. The structural/conductor plate couples with the coupling elements and has screed plate retaining locks to securely receives the retainer quick-connect/releases, in order to secure itself to the modular screed plates. The structural/conductor plate receives heat directly from the heating element, and provides indirect heat to the modular screed plate array.

25 Claims, 11 Drawing Sheets

(56) References Cited

U.S. PATENT DOCUMENTS

| | | | | |
|---|---|---|---|---|
| 6,551,021 | B2 | 4/2003 | Baker | |
| 8,113,738 | B2 | 2/2012 | Mahler et al. | |
| 8,517,628 | B2 | 8/2013 | Weiser et al. | |
| 8,517,630 | B2 | 8/2013 | Graham et al. | |
| 8,961,064 | B2 * | 2/2015 | Ramos | E01C 19/42 404/118 |
| 9,103,078 | B2 * | 8/2015 | Lutz | E01C 19/42 |
| 9,181,662 | B2 | 11/2015 | Kopacz et al. | |
| 9,267,248 | B2 * | 2/2016 | Christ | E01C 19/48 |
| 9,777,445 | B1 | 10/2017 | Engel et al. | |
| 9,885,158 | B2 * | 2/2018 | Grimm | E01C 23/14 |
| 2004/0086336 | A1 * | 5/2004 | Nelson | E01C 19/4833 404/72 |
| 2014/0377003 | A1 | 12/2014 | Kopacz et al. | |

* cited by examiner

AMENDED

MODULAR SCREED PLATE ASSEMBLY AND METHOD OF ASSEMBLING A SCREED PLATE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

This patent disclosure relates to road paving machines and, more particularly, to various aspects of a heated modular screed assembly for a road paving machine.

BACKGROUND OF THE INVENTION

The basic concept of the asphalt or concrete road paver system has remained relatively unchanged for many years. Screed plate assemblies for paving are found and utilized in various construction paving industrial settings, such as pavement of highways, airports, streets and other sites requiring paving of constructional site beds and pads, requiring a paving mat. Paving materials, such as concrete or hot mix asphalt (HMA), is loaded in the front of the road paving tractor, typically in a hopper, and conveyed to the rear by a set of flight feeders (conveyor belts), where it is spread out to a desired width by a set of augers in the road paver, and then leveled and compacted by a screed plate. The most critical feature of a road paver is the self-leveling, or free floating, screed unit or assembly which will determine the quality or profile of the material being paved or placed on the road bed at the correct mat smoothness and thickness. The free floating screed assembly slides across the material. The screed plate is the flat bottom portion of the screed assembly that flattens and compresses the material into the mat. Screed heaters or heating elements, such as gas and electric heating elements, are used to preheat the screed so that the material does not stick to the screed plate and cause mat tearing.

There has been in the road paving industry a recognized need for changing worn screed plates to a road paving machine. Flexibility and ease of changing screed plate assemblies is found to be extremely beneficial in construction paving operations. Dealing with loss of operation time, increased costs and operational restrictions and limitation of current screed plates are major concerns for paving operations.

The conventional screed plate assembly is constructed of a one piece metal alloy screed plate. Screed plate replacement, particularly on site, is difficult, time consuming and laborious. Screed plates during paving do not wear evenly. The wear on the screed plates typically occurs in isolated spots on the plate. There needs to be an assembly, system or device whereby lower wear areas of the screed plate may be rotated to higher wear areas, or higher wear areas need to be replaced while leaving lower wear areas in place.

In the conventional technology used today, the paving machine provides an electrically or gas heated screed assembly with heating elements attached to or adjacent to a screed plate. This conventional screed plate assembly provides for one screed plate underlying the paving machine. There is no known technology being used to solve the problem of screed plate wear maintenance that does not include removing the entire screed, and the structural plate adjacent to the heating element of the paving machine. Removal of the plate in conventional screed plate assemblies requires, in most cases, disassembly of the heating system as well as the plate. As well, there has been no device to solve the problem of the uneven wear experienced by conventional screed plate assemblies.

Finally, there is a need to be able to utilize different screed plate materials for differing applications. The conventional structural/conductor plate is a single plate made of steel, required in part due to its direct contact with the heating system. A separate structural/conductor plate providing for intervening, direct contact with the heating system would allow for the use of alternative materials for the screed plates. Alternative materials, such as nickel, copper, aluminum, steel or metal alloy of copper or nickel (having high conductivity and anti corrosion capabilities), will provide better conductivity and corrosion resistence.

The conventional screed plate is a single plate made of steel, required in part due to the structural requirements of having one piece of plate engaged in paving. Alternative materials, such as cast nickel hardened, or "Ni-hard", or poly-plastics, and modular plates, will provide longer wear and/or less costly alternatives.

The references described in the related art do not disclose features of the present invention and would not be as suitable for the required purpose of the present invention hereinafter described. Screed plate devices are found in the related art, exemplified by U.S. Pat. No. 6,551,021 to Baker ("Baker"); U.S. Pat. No. 8,517,630 to Graham et al. ("Graham"); and U.S. Pat. No. 9,181,662 to Kopacz et al. ("Kopacz"). Graham discloses the use of upper and lower screed plates with an electric resistive heater disposed between the upper and lower plates to directly heat both plates. The upper plate in Graham remains fixed while the lower plate may be removed and replaced. The upper and lower plates of Graham have different wear and thermal properties. Kopacz discloses a screed electrical heating assembly that is adapted to provide easy replacement, and a similar arrangement to Graham. However, none of the known references disclose or suggest the use of a fixed structural/conductor plate in place of a fixed upper screed plate frame with the heating means disposed to only heat the structural/conductor plate. Graham and Kopacz disclose a heating means provided between the fixed screed plate frame and the lower screed plate which provides direct heating to the screed plate. There is no prior art suggestion for moving the heating means so that it may only heat the upper frame plate which will then provide indirect heat to the screed plate as in the present invention.

Baker discloses a screed plate attaching to a support assembly and having an interlock system comprising tabs and notches that are configured to fit together and secured by a fastener. The tab and slot system in Baker simply prevents non-matching plates from interconnecting. There is no disclosure in any of the references for the tab and slot locking system of the proposed structural/conductor plate to the screed plate as disclosed by the present invention.

None of the references in the prior art contain every feature of the present invention, and none of these references in combination disclose, suggest or teach every feature of the present invention.

The foregoing and other objectives, advantages, aspects, and features of the present invention will be more fully understood and appreciated by those skilled in the art upon consideration of the detailed description of a preferred embodiment, presented below in conjunction with the accompanying drawings.

SUMMARY OF THE INVENTION

The present invention is a modular screed plate assembly and method of assembling a screed plate relating to road paving machines and, more particularly, to various aspects of a heated modular screed assembly for a road paving machine. The present invention has a road paver/finisher, a structural/conductor plate and a plurality of modular screed plates. The road paver/finisher has a paver under side, a power source and a heating element, providing the power source for the paving and for generating electricity to the heating element, ultimately heating the plurality of modular screed plates. In alternative embodiments the power source may be at least one of electrical, gas or hydraulic power, to produce electrical heat, attached to the structural/conductor plate, and in alternative embodiments, to provide gas heat or hydraulic heat directly to the structural/conductor plate. The heating element is located between the paver under side and the top conductor side and, immediately against the top conductor side, providing direct heat to the structural/conductor plate.

The present invention has a plurality of modular screed plates, each of the plurality of modular screed plates having, a coupling element, and a retainer quick-connect/release means, and align and interlock as a modular screed plate array, providing a tensionally yielding gap allowing the modular screed plate array to absorb the varying pressures from the operations of the road paver/finisher, facilitating a continuous, steady operation, as well as a paving material flow interrupting barrier, acting to interrupt the flow of the paving material in the tensionally yielding gap. The coupling element enables a pressure connective, secure attachment of each modular screed plate to the structural/conductor plate. Each of the plurality of screed plate retaining locks securely receives the retainer quick-connect/release means from each of the respective plurality of modular screed plates. Concurrently, the structural/conductor plate receives the respective coupling element from each of the respective plurality of modular screed plates. The modular screed plate array securely and heat-conductively contacts the structural/conductor plate, which receives heat directly from the heating element, and in turn, provides indirect heat to the modular screed plate array.

In an alternative embodiment of the present invention, a road paver/finisher has a paver under side, a power source and a heating element, the power source generating and providing electricity to the heating element causing the heating element to heat the paver under side. The modular screed plate array receives heat directly from the heating element. Another embodiment of the present invention is a screed plate assembly method, generating electricity from the road paver/finisher, providing direct heat from the heating element to the structural/conductor plate. Another embodiment method of the present invention allows the power source to generate at least one of gas heat or hydraulic heat to the heating element providing direct heat from the heating element to the structural/conductor plate.

There are numerous advantages and advancements of the present invention. The modular screed plate assembly may be used with various types of surface paving material, such as asphalt, concrete, and other aggregate type pavers.

The plurality of modular screed plates may be used in the place of a conventional single screed plate. The heating element that would heat a conventional screed plate now heats the structural/conductor plate, and, indirectly, the plurality of modular screed plates, which can be made from a variety of resilient materials of various metallic styles, compositions and textures, allowing for the expansion of the types of paving construction job. The indirect heat permits the use of a variety of materials from which each of the plurality of modular screed plates may be constructed, depending upon the paving application.

The plurality of retainer quick-connect/release means, provided to connect with the respective plurality of screed retaining locks, facilitates the use of a variety of difference screed surface plates that may be quickly interchanged depending on paving surface application needs, caused by a changes in screed plate type due to surfacing paving material, ambient temperature or wear on a particular plate during the operation.

The structural/conductor plate in alternative assembly and method embodiments remains in place at all times during operation of the road paver/finisher. Neither the heating element nor the structural/conductor plate need be dismantled for wear plate maintenance of the plurality of modular screed plates, as would be required in conventional screed plate assemblies. The tensionally yielding gap allows purposely bowing for a crowned paving material or natural bowing in the modular screed plate array, which will necessarily occur due to the extreme heat applied directly or indirectly in the paving process.

The present invention allow for easy wear maintenance, with quick changing of the plurality of modular screed plates. Differing types of paving material may be employed to allow for differing products used to create the paving mat or surface, to suit the construction specifications of a particular paving job. Because of the use of the structural/conductor plate, varying plate materials may be employed to make the plurality of modular screed plates which are better suited to a particular construction job, and which do not require the structural integrity needed with a conventional one screed plate assembly.

The aforementioned features, objectives, aspects and advantages of the present invention, and further objectives and advantages of the invention, will become apparent from a consideration of the drawings and ensuing description.

BRIEF DESCRIPTION OF THE SEVERAL VIEWS OF THE DRAWINGS

The foregoing features and other aspects of the present invention are explained and other features and objects of the present invention will become apparent in the following detailed descriptions, taken in conjunction with the accompanying drawings. However, the drawings are provided for purposes of illustration only, and are not intended as a definition of the limits of the invention.

FIG. 7A illustrates a blown up partial side elevational view of an opposing screed backside as it is secured to one of a plurality of modular screed plates to a modular screed plate array as it is securely attached to an opposing conductor backside of a structural/conductor plate, by a retainer-quick release/connect means, depicted here as a bolt and screw in one embodiment of the present invention.

DETAILED DESCRIPTION OF THE INVENTION

Figure 1:
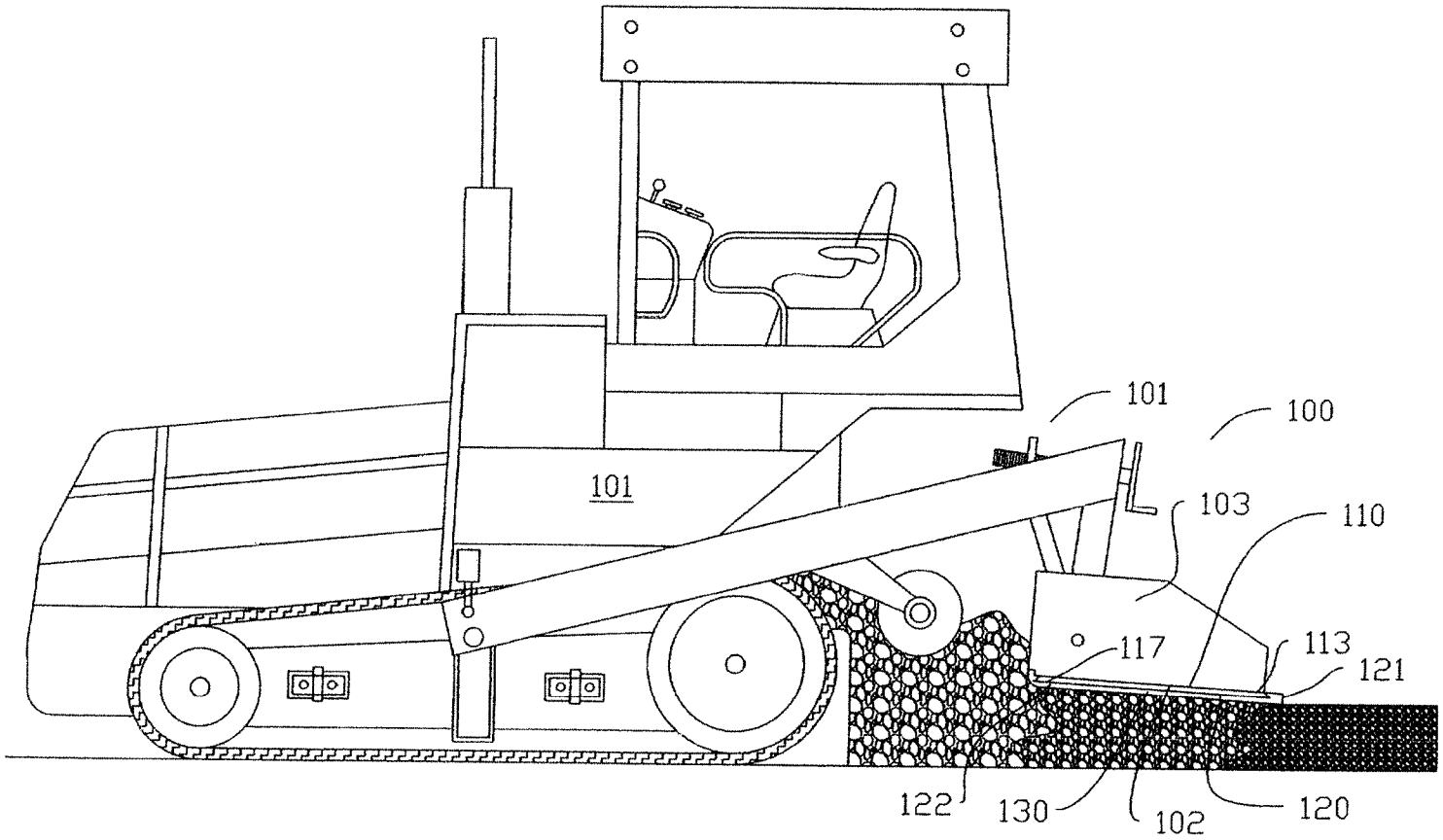
FIG. 1 illustrates an elevated side view of one embodiment of the present invention, depicting a road paver/finisher having a modular screed plate assembly including a structural/conductor plate.

The present invention will now be described more fully hereinafter with references to the accompanying drawings, in which the preferred embodiment of the invention is shown. This invention, however, may be embodied in different forms, and should not be construed as limited to the embodiments set forth herein. Rather, the illustrative embodiments are provided so that this disclosure will be thorough and complete, and will fully convey the scope of the invention to those skilled in the art. It should be noted, and will be appreciated, that numerous variations may be made within the scope of this invention without departing from the principle of this invention and without sacrificing its chief advantages. Like numbers refer to like elements throughout. A representative number of certain repeated elements are labeled in the drawings.

Figure 2:
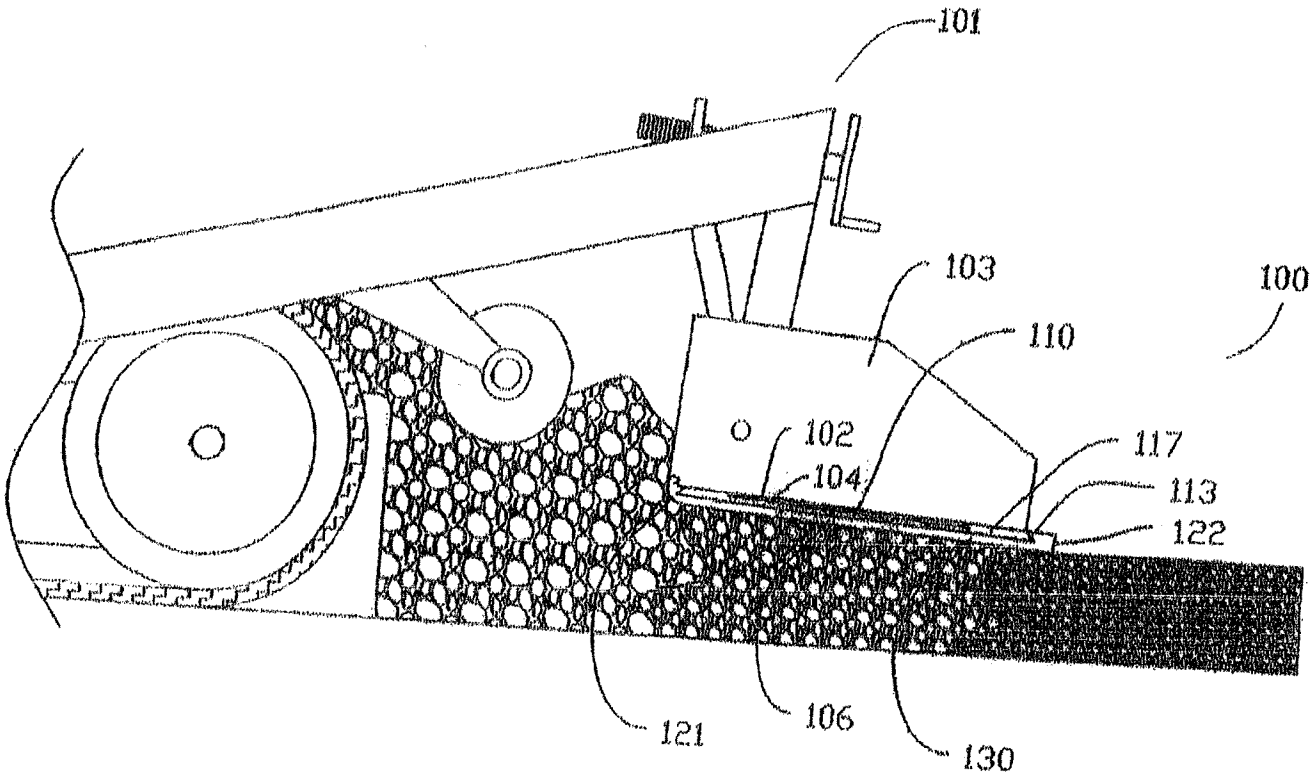
FIG. 2 illustrates a blown up partial, elevated side of FIG. 1, of one embodiment of the present invention, depicting a modular screed plate assembly.

Turning now in detail to the drawings in accordance with the present invention, one embodiment of the present invention is depicted in FIGS. 1 and 2, elevated side views of one embodiment of the present invention, having a modular screed plate assembly 100 having a road paver/finisher 101; a structural/conductor plate 110 and a plurality of modular screed plates 120. The road paver/finisher 101 comprises a paver under side 102, a power source 103 and a heating element 104 (depicted in FIGS. 2 and 4). The road paver/finisher 101 in this embodiment of the present invention, as well as in the alternative embodiments, such as the embodiment shown in FIG. 8 as road paver/finisher 201, may be any one of a number of types and brands of surface paver/finishers well known and used in the surface paving industry. The road paver/finisher 101 provides a power source 103 for the paving and for the generating and providing of electricity to the heating element 104 causing the heating element 104 to heat, ultimately heating the plurality of modular screed plates 120. The power source 103 or 203 to heat the heating element 104 and 204 in alternative embodiments of the present invention may comprise at least one of electrical, gas or hydraulic power, to produce electrical heat in the heating element 104 and 204 (see also FIGS. 8-11), attached to the structural/conductor plate 110, and in alternative embodiments, to provide gas heat or hydraulic heat directly to the structural/conductor plate 110.

Figure 3:
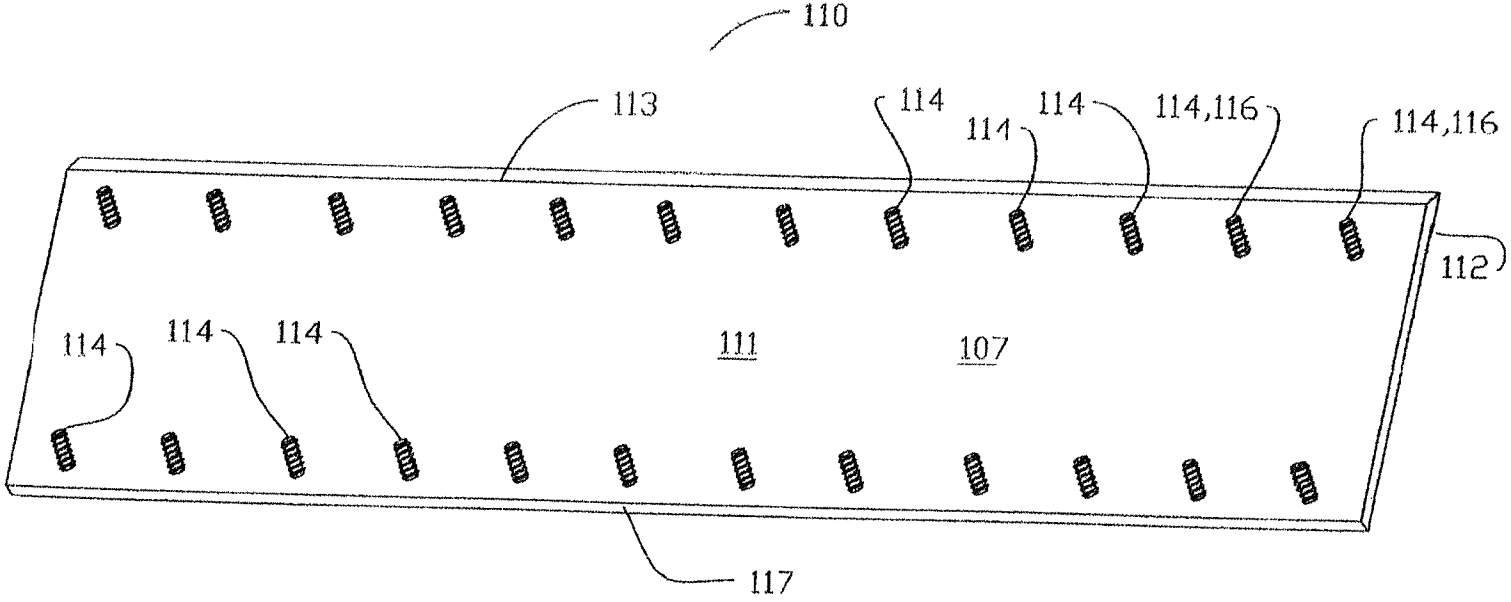
FIG. 3 illustrates a perspective view of one embodiment of the present invention, depicting a top conductor side of the structural/conductor plate.
Figure 4:
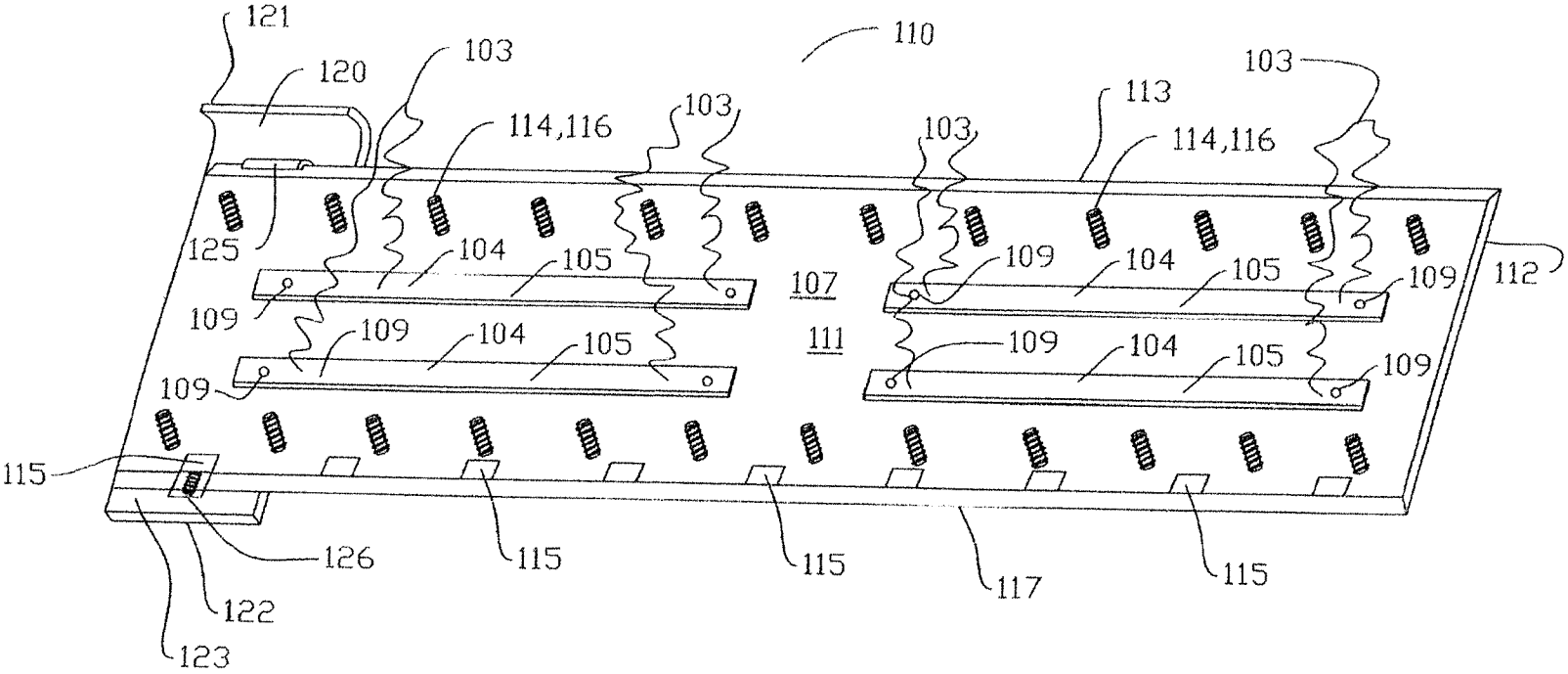
FIG. 4 illustrates a perspective view of one embodiment of the present invention, depicting a top conductor side of the structural/conductor plate of FIG. 3, and including one of the plurality of modular screed plates and at least one electrical heating strip as a heating element. The heating element is depicted in FIG. 4; as well as FIGS. 7-10: and should be understood as receiving electricity from a power source to provide heat, by a jagged line from the power source.

Shown in FIGS. 3 and 4, the structural/conductor plate 110 comprises a top conductor side 111 and an opposing bottom conductor side 112, a conductor front side 113 and an opposing conductor backside 117, a plurality of conductor plate fastening means 114; and a plurality of screed plate retaining locks 115. The heating element 104 attaches to the top conductor side 111 by a plurality of heating element fastening means 109. The heating element 104 is located between the paver under side 102 and the top conductor side 111 and, immediately against the top conductor side 111, providing direct heat to the structural/conductor plate 110.

The heating element 104 in an alternative embodiment of the present invention comprises at least one electrical heating strip 105, as depicted in FIG. 4. The plurality of heating element fastening means 109 in alternative embodiments may comprise at least one of threaded nuts and bolts, cotter pins or leaf spring clips.

The plurality of conductor plate fastening means 114, shown in FIGS. 3 and 4, attach the structural/conductor plate 110 at its top conductor side 111 to the paver under side 102 of the road paver/finisher 101.

Figure 5:
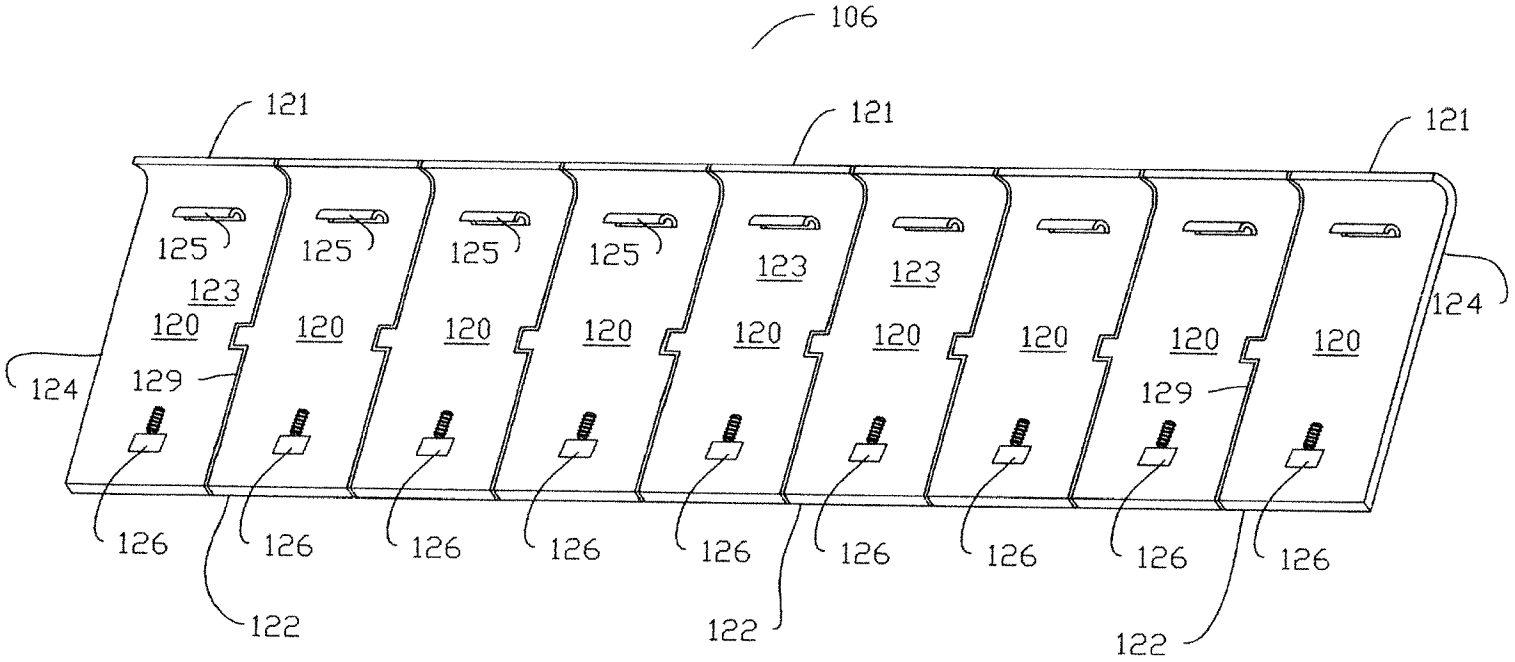
FIG. 5 illustrates a perspective view of one embodiment of the present invention, depicting screed top sides of a plurality of modular screed plates, aligning and interlocking as a screed plate array.
Figure 6:
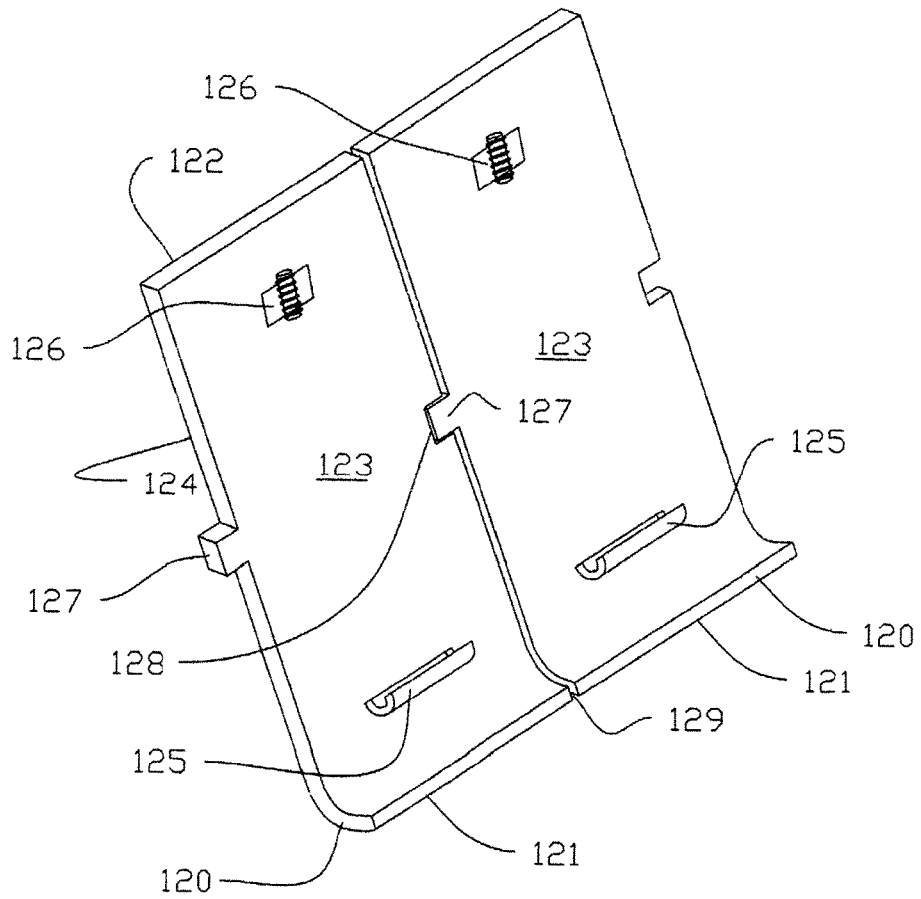
FIG. 6 illustrates an enlarged perspective view of one embodiment of the present invention, depicting screed top sides of a plurality of modular screed plates aligning and interlocking.

As shown in FIG. 4-5, and particularly in FIG. 6, the modular screed plate assembly 100 of the present invention has a plurality of modular screed plates 120, each of the plurality of modular screed plates 120 having a screed front side 121 and an opposing screed back side 122, a screed top side 123 and an opposing screed bottom side 124, a coupling element 125 located on the screed top side 123 proximal to the screed front side 121, a plurality of retainer quick-connect/release means 126 being located on the screed top side 123 proximal to the opposing screed back side 122, and a screed interlocking side 127 and an opposing screed receiving side 128. The plurality of modular screed plates 120 align and interlock, or interconnect, as a modular screed plate array 106. The screed interlocking side 127 securely, cooperatively, tensionally yields and conductively interlocks with the opposing screed receiving side 128 to an adjacent one of the plurality of modular screed plates 120, as pressure is exerted on the plurality of modular screed plates 120 during surface application paving operations. The screed interlocking side 127 and the opposing screed receiving side 128 interveningly provide a tensionally yielding gap 129 where the screed interlocking side 127 and the opposing screed receiving side 128 are interlocking, the tensionally yielding gap 129 locating or intervening between the screed interlocking side 127 and the opposing screed receiving side 128. The tensionally yielding gap 129 allows the modular screed plate assembly 100, and particularly the modular screed plate array 106, to absorb the varying pressures from the surface application operations of the road paver/finisher 101 facilitating a continuous, steady operation. The tensionally yielding gap 129 also provide a paving material 130 flow interrupting barrier, acting to interrupt the flow of the paving material 130 in the tensionally yielding gap 129. The tensionally yielding gap 129 may be constructed in the manner shown in FIGS. 4 and 5, or in alternative embodiments as having a single "jog" or interrupting sides, or coupling pair of angles in the screed interlocking side 127 and an opposing screed receiving side 128. It is understood in the present invention that these "interlocking" sides of the plurality of modular screed plates 120 act to interconnect or couple to facilitate the interruption or regulation of the flow of the paving material, and do not precisely or necessarily lock together.

The plurality of retainer quick-connect/release means 126, in FIG. 6 (and 226, in FIG. 9 in an alternative embodiment) may be a number of quick-connect/release mechanisms common in the industry, such as a threaded bolt, nut and screw, cam or spring and catch. The coupling element 125 (and 225 below in an alternative embodiment) may be any number of elements of a curved or angular configuration, *having a protruding edge,* integrated into the modular screed plate 120 enabling a pressure connective, secure attachment or coupling of the coupling element 125 to the conductor front side 113 of the structural/conductor plate 110 in the modular screed plate assembly 100; and a pressure connective, secure attachment or coupling of the coupling element 225 to the conductor front side 213 of the structural/conductor plate 110 in the modular screed plate assembly 200 discussed below and shown in FIGS. 8-11.

As shown in FIGS. 1-7A, each of the plurality of screed plate retaining locks 115 to the structural/conductor plate 110 securely receives the plurality of retainer quick-connect/release means 126 from each of the respective plurality of modular screed plates 120 as a means to secure the plurality of modular screed plates 120 to the structural/conductor plate 110 or the paver under side 202, in differing embodiments. Concurrently, the conductor front side 113 of the structural/conductor plate 110 securely and freely receives the respective coupling element 125 from each of the respective plurality of modular screed plates 120, the opposing bottom conductor side 112 being in direct contact with the screed top side 123.

As shown in FIGS. 1 and 2, the modular screed plate array 106 securely and heat-conductively contacts the opposing bottom conductor side 112 of the structural/conductor plate 110. The structural/conductor plate 110, receives heat directly from the heating element 104, located against the top conductor side 111, and in turn, provides indirect heat to the modular screed plate array 106, located against the opposing bottom conductor side 112.

The structural/conductor plate 110, shown in FIGS. 1-4 comprises a heat conductive material 107. The heat conductive material 107, shown in FIG. 4, in alternative embodiments of the present invention comprises or is made of at least one of nickel, copper, aluminum, steel or metal alloy of copper or nickel, or other suitable conductive and structurally sound material, also including copper plated steel or copper plated aluminum.

The plurality of conductor plate fastening means 114, shown in FIGS. 3-4, to the structural/conductor plate 110 in one embodiment of the present invention comprises: a plurality of threaded nut and bolt fastenings 116.

Figure 8:
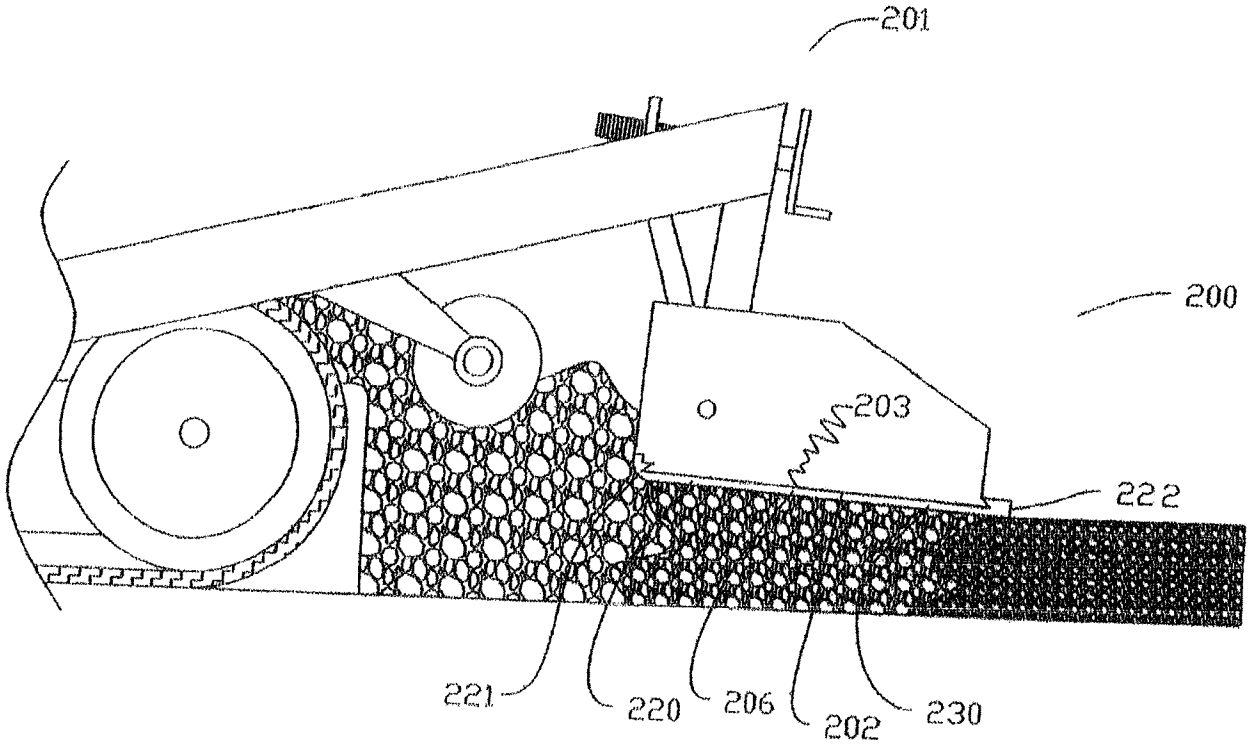
FIG. 8 illustrates an elevated side view of another embodiment of the present invention, depicting a road paver/finisher having a modular screed plate assembly without a structural/conductor plate.

In an alternative embodiment of the present invention, as shown in FIG. 8, the modular screed plate assembly 200 comprises a road paver/finisher 201 having a paver under side 202, a power source 203 and a heating element 204, the power source 203 generating and providing electricity to the heating element 204 causing the heating element 204 to heat. The paver under side 202 has a plurality of screed plate retaining locks 215, depicted in FIG. 10.

In this alternative embodiment of the present invention, the modular screed plate assembly 100 comprises a plurality of modular screed plates 220, shown in FIGS. 8-11. Shown in FIGS. 9-11, each of the plurality of modular screed plates 220 comprises a screed front side 221 and an opposing screed back side 222; a screed top side 223 and an opposing screed bottom side 224; a coupling element 225 located on the screed top side 223 proximal to the screed front side 221; a plurality of retainer quick-connect/release means 226 located on the screed top side 223 proximal to the opposing screed back side 222; a screed interlocking side 227 and an opposing screed receiving side 228. The screed interlocking side 227 and the opposing screed receiving side 228 provide a tensionally yielding gap 229, acting as a paving material flow interrupting barrier, where the screed interlocking side 227 and the opposing screed receiving side 228 are interlocking. The plurality of modular screed plates 220 align and interlock as a modular screed plate array 206. The screed interlocking side 227 securely, cooperatively, tensionally yields and conductively interlocks with the opposing screed receiving side 228 to an adjacent one of the plurality of modular screed plates 220, as pressure is exerted on the plurality of modular screed plates 220 during surface paving application operations. The tensionally yielding gap 229 allows the modular screed plate assembly 200, and particularly the modular screed plate array 206 to absorb the varying pressures from the surface application operations of the road paver/finisher 201 facilitating a continuous, steady operation.

Figure 9:
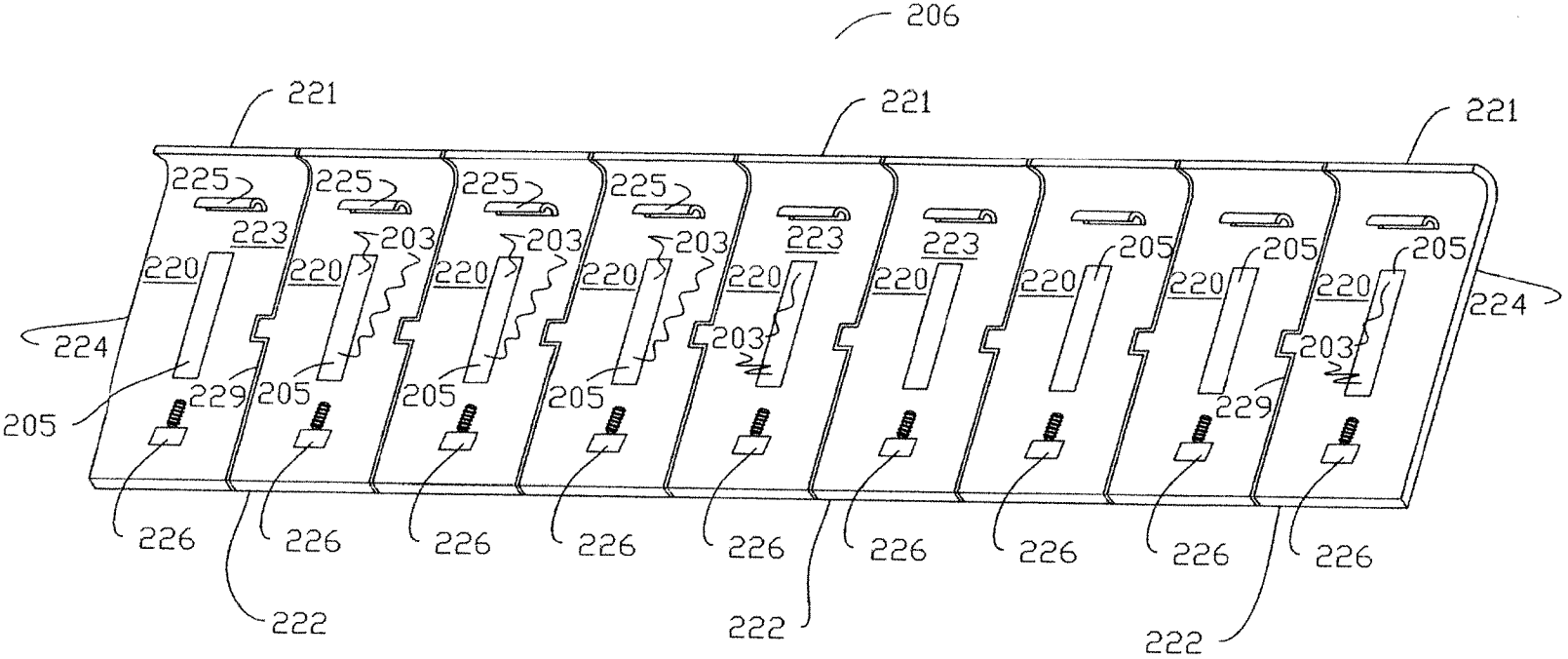
FIG. 9 illustrates a perspective view of one embodiment of the present invention, depicting screed top sides of a plurality of modular screed plates, aligning and interlocking as a screed plate array, and each of a plurality of modular screed plates having one at least one electrical heating strip.

In this alternative embodiment of the present invention, shown in FIG. 8-11, each of the plurality of screed plate retaining locks 215 securely receives a plurality of retainer quick-connect/release means 226 from each of the respective plurality of modular screed plates 220, and concurrently a paver under side 202 securely and freely receives the respective coupling element 225 from each of the respective plurality of modular screed plates 220. The modular screed plate array securely and heat-conductively contacts the paver under side 202: and the heating element 204 located immediately between and securely against the paver under side 202 and the screed top side 223 of the respective plurality of modular screed plates 220, thereby providing direct heat to the modular screed plate array 206. The heating element 204 comprises: at least one electrical heating strip 205, as depicted in FIG. 9.

Figure 10:
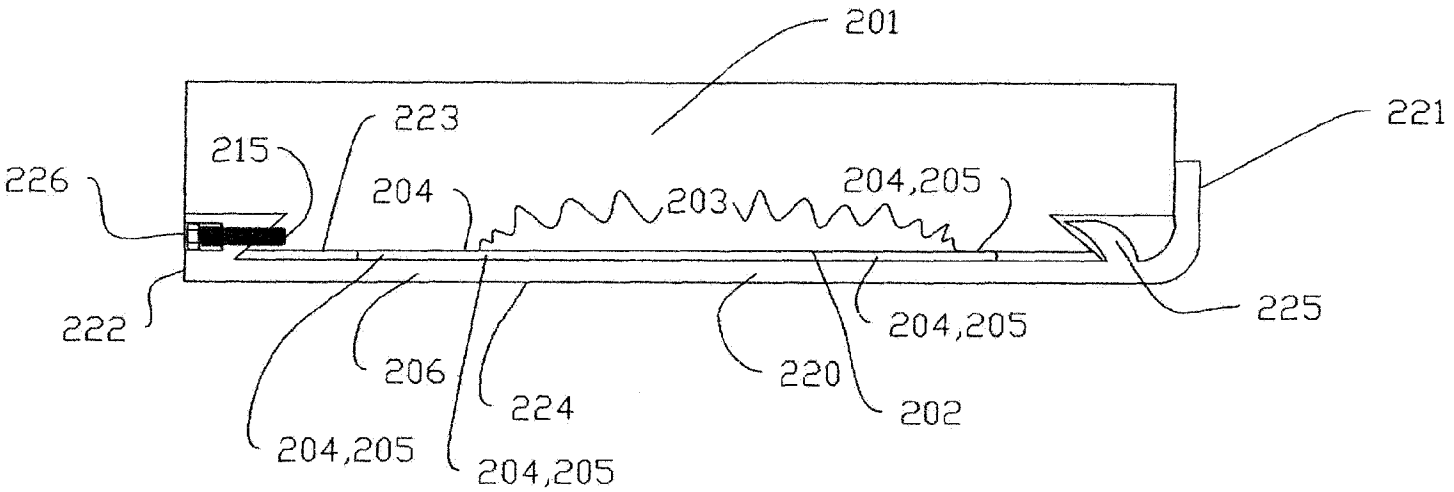
FIG. 10 illustrates an elevated side perspective view the modular screed plate array connected to the paver under side of a road paver/finisher in one embodiment of the present invention without a structural/conductor plate. The heating element is depicted in FIG. 10, and should be understood herein, as receiving electricity from the power source, by a jagged line from the power source.

As shown in FIGS. 8 and 10, the modular screed plate array 206 securely, directly and heat-conductively contacts the heating element 204 which in turn directly contacts the paver under side 202 of the road paver/finisher 201. The modular screed plate array 206, and each respective one of the plurality of modular screed plates 220, receives heat directly from the heating element 204.

In another embodiment of the present invention as a screed plate assembly method, having the elements as shown in FIGS. 1-7A, the method comprises a road paver/finisher 101 having a paver under side 102, a power source 103 and a heating element 104. The method further provides having a structural/conductor plate 110 comprising a top conductor side 111 and an opposing bottom conductor side 112, a conductor front side 113, and a plurality of conductor plate fastening means 114. This alternative method provides a plurality of screed plate retaining locks 115.

This method of the present invention generates and provides electricity from the road paver/finisher 101 to the heating element 104 causing the heating element 104 to heat by locating the heating element 104 immediately against the top conductor side 111; by providing direct heat from the heating element 104 to the structural/conductor plate 110 from the heating element 104; and attaching the structural/conductor plate 110 at its top conductor side 111 to the paver under side 102 of the road paver/finisher 101 using the plurality of conductor plate fastening means 114. Another embodiment method of the present invention the power source 103 generates and provides at least one of gas heat or hydraulic heat to the heating element 104 causing the heating element 104 to heat the top conductor side 111 and providing direct heat from the heating element 104 to the structural/conductor plate 110 from the heating element 104. The gas heat may be generated by propane burner heat in alternative embodiments. In another alternative embodiment, the power source 103 may generate diesel fuel.

These alternative embodiment methods, as well, provide a plurality of modular screed plates 120, shown in FIGS. 4-6. Each of the plurality of modular screed plates 120 have a screed front side 121 and an opposing screed back side 122, and a screed top side 123 and an opposing screed bottom side 124.

As depicted in FIGS. 5-6, these alternative embodiment methods also provide a coupling element 125 located on the screed top side 123 proximal to the screed front side 121, and a plurality of retainer quick-connect/release means 126 located on the screed top side 123 proximal to the opposing screed back side 122. Each of the plurality of modular screed plates 120 has a screed interlocking side 127 and an opposing screed receiving side 128. This method thereby is securely, cooperatively, tensionally yielding and conductively interlocking the screed interlocking side 127 to an adjacent one of the plurality of modular screed plates 120 with the opposing screed receiving side 128, and aligning and interlocking, as a modular screed plate array 106, the plurality of modular screed plates 120. A tensionally yielding gap 129 is created between the screed interlocking side 127 and the opposing screed receiving side 128 to allow for tensional bowing of the modular screed plate array 106, and act as a paving material 130 flow interrupter or interrupting barrier, the bowing resulting from tensional yielding of the modular screed plate array 106, due to expansion of the modular screed plate array 106 from heat and from operating with crowning paving material 130. The tensionally yielding gap 129 allows the modular screed plate assembly 100, and particularly the modular screed plate array 106, in this bowing manner to absorb the varying pressures from the surface paving application operations of the road paver/finisher 101, facilitating a continuous, steady operation.

Figures 7, 7A:
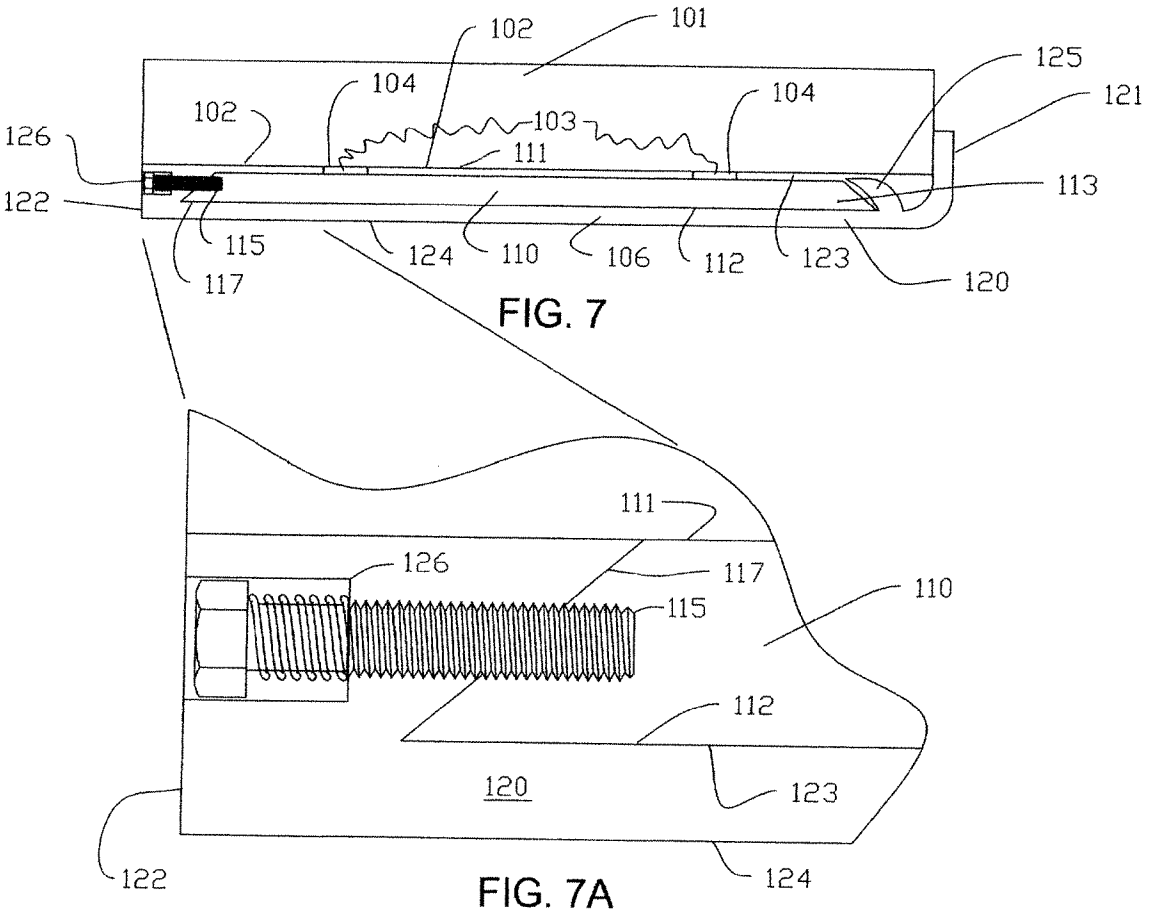
FIGS. 7 and 7A illustrate elevated side perspective views of the structural/conductor plate and the modular screed plate array connected to the paver under side of a road paver/finisher in one embodiment of the present invention.

As shown in FIGS. 4, 7 and 7A, these alternative embodiment methods securely receive the plurality of retainer quick-connect/release means 126 at each of the respective plurality of screed plate retaining locks 115, and concurrently, securely and freely receive the respective coupling element 125 at the conductor front side 113 of the structural/conductor plate 110; thereby securely and conductively contacting the opposing bottom conductor side 112 of the structural/conductor plate 110 with the modular screed plate array 106. The opposing bottom conductor side 112 is in direct contact with the screed top side 123. This method provides indirect heat to the modular screed plate array 106 in this manner from the heating element 104 by conducting the heat through the structural/conductor plate 110. *The heating element 104 is positioned between the coupling element 125, first connector, and the quick-connect/release means 126, second connector.* The heating element 104 comprises at least one electrical heating strip 105. The plurality of heating element fastening means 109 [composes] *comprises* at least one of threaded nuts and bolts, cotter pins or leaf spring clips.

The screed plate assembly method of an alternative of the present invention further has the structural/conductor plate 110, depicted in FIGS. 1 and 2 composed of a heat conductive material 107, generally made of steel, which in different embodiments may be made of nickel, copper, aluminum, steel or plated or metal alloy of copper or nickel. The plurality of conductor plate fastening means 114, depicted in FIGS. 3 and 4, in this embodiment comprise a plurality of threaded nut and bolt fastenings, and may be other fastening means. The power source provides in this method electrical heat, gas heat or hydraulic heat.

In another alternative embodiment of the present invention, of a screed plate assembly method, for the elements shown in FIGS. 8-11, has a road paver/finisher 201 further comprised of a paver under side 202, a power source 203 and a heating element 204. The road paver/finisher 201 in this embodiment generates and provides electricity to the heating element 204 from the power source 203 causing the heating element 204 to heat. This alternative embodiment method has a plurality of screed plate retaining locks 215 on the paver under side 202; and a plurality of modular screed plates 220, each of the plurality of modular screed plates 220 having a screed front side 221 and an opposing screed back side 222; a screed top side 223 and an opposing screed bottom side 224 and a coupling element 225 located on the screed top side 223 proximal to the screed front side 221. As well, this alternative method has a plurality of retainer quick-connect/release means 226 located on the screed top side 223 proximal to the opposing screed back side 222, a screed interlocking side 227 and an opposing screed receiving side 228. This method securely, cooperatively, tensionally yielding, and conductively interlocks the screed interlocking side 227 to an adjacent one of the plurality of modular screed plates 220 with the opposing screed receiving side 228, thereby aligning and interlocking, as a modular screed plate array 206, the plurality of modular screed plates 220. A tensionally yielding gap 229 is created between the screed interlocking side 227 and the opposing screed receiving side 228 to allow for tensional bowing of the modular screed plate array 206, and act as a paving material 230 flow interrupter or interrupting barrier, the bowing, resulting from tensional yielding of the modular screed plate array 206, as described above for the screed interlocking side 227 and the opposing screed receiving side 228. The tensionally yielding gap 229 allows the modular screed plate assembly 200, and particularly the modular screed plate array 206, in this bowing manner to absorb the varying pressures from the surface application operations of the road paver/finisher 201, facilitating a continuous, steady operation.

As shown in FIGS. 8-11, this alternative embodiment method securely receives the plurality of retainer quick-connect/release means 226 at each of the respective plurality of screed plate retaining locks 215, and concurrently, securely and freely receives the respective coupling element 225 from each of the respective plurality of modular screed plates 220 to the paver under side 202.

As shown in FIGS. 8 and 10, this alternative method provides for securely and heat-conductively contacting the modular screed plate array 206 with the paver under side 202 and locating the heating element 204 immediately between and securely against the paver under side 202 and the screed top side 223, thereby providing direct heat to the modular screed plate array 206. The modular screed plate array 206, and each respective one of the plurality of modular screed plates 220, receives heat directly from the heating element 204. The heating element 204 in an alternative embodiment comprises at least one electrical heating strip 205. The power source 203 in an alternative embodiment of comprises at least one of electrical heat, gas heat or hydraulic heat.

There are numerous advantages and advancements with the various embodiments of the present invention. The present invention, as a modular screed plate assembly 100 and 200, may be used with various types of surface paving material, 130 or 230 respectively, such as asphalt, concrete, and other aggregate type pavers. As described above, one embodiment (modular screed plate assembly 100) of the present invention, shown in FIGS. 1-7A, includes the structural/conductor plate 110 that fastens with the plurality of modular screed plates 120 in the present invention in the place of a conventional single screed plate. The heating element 104 that would heat a conventional screed plate now heats the structural/conductor plate 110 of the modular screed plate assembly 100 of the present invention. In this manner, the plurality of modular screed plates 120 are heated indirectly. As depicted in FIGS. 4 and 9, the heating element in the alternative embodiments comprises at least one electrical heating strip, 105 and 205 respectively.

The plurality of modular screed plates 120 and 220, depicted in respective FIGS. 5, 6, 9 and 11, can be made from a variety of resilient materials of various metallic styles, compositions and textures, allowing for the expansion of the types of paving construction job. Thereby the modular screed assembly 106 and 206 can be made more specific to a particular industrial application. This benefit allows the modular screed plate assembly 100 and 200 shown in FIGS. 1-11, of the present invention to have a more diverse paving application than with the conventional screed plate assemblies known in the related art.

As referenced above, the heat conducting element, the heating element 104 and 204 of the present invention, depicted in respective FIGS. 4 and 9, is provided, in one embodiment (modular screed plate assembly 100 and 200), to directly heat the structural/conductor plate 110 in modular screed plate assembly 100 which assembly and method will indirectly heat the plurality of modular screed plates 120, as shown in FIG. 4; and in alternative assembly and method embodiments (modular screed plate assembly 200) to directly heat the plurality of modular screed plates 220, as shown in FIG. 9. The indirect heat of the plurality of modular screed plates 120 permits the use of a variety of materials from which each of the plurality of modular screed plates 220 may be constructed, depending upon the paving application.

The plurality of retainer quick-connect/release means 126 and 226 or catch, depicted in respective FIGS. 4-7A and 9-11, is a means for attaching each of the plurality of modular screed plates 120 and 220, and is provided to lock or connect with the respective plurality of screed retaining locks 115 and 215, to facilitate the use of a variety of difference screed surface plates that may be quickly interchanged depending on paving surface application needs. The application need may be caused by a changes in screed plate type due to surfacing paving material 130 or 230, ambient temperature or wear on a particular plate during the operation. The plurality of modular screed plates 120 are subject to high degrees of wear in the paving operation.

The structural/conductor plate 110, in alternative assembly and method embodiments of the present invention depicted in FIG. 3, remains in place at all times during operation of the road paver/finisher 101, using the this modular screed plate assembly 100. Neither the heating element 104 nor the structural/conductor plate 110 need be dismantled for wear plate maintenance of the plurality of modular screed plates 120, as would be required in conventional screed plate assemblies.

As described above, in depicted in FIGS. 3-7A, the plurality of modular screed plates 120 are fastened to the structural/conductor plate 110 by the plurality of conductor plate fastening means 114, allowing for quick and easy release of each of the plurality of modular screed plates 120 from the structural/conductor plate 110. This process of wear plate maintenance may take place on site with a minimum of work "down time" during a paving operation for a road or other paving surface.

The plurality of screed plate retaining locks 115 and 215, depicted in respective FIGS. 4-7A and 9-11, are shown to cooperatingly secure the plurality of retainer quick-connect/release means 126 and 226, respectively of the plurality of modular screed plates 120 and 220, and which plurality of retainer quick-connect/release means 126 and 226 may be any number of locking and quick release locking means such as the retainer quick-release connect/release means shown in FIGS. 7, 7A and 10, having a threaded bolt, or as noted above, nut and screw, cam or spring and catch, or one having a spring loaded operating tab and locking system.

Figure 11:
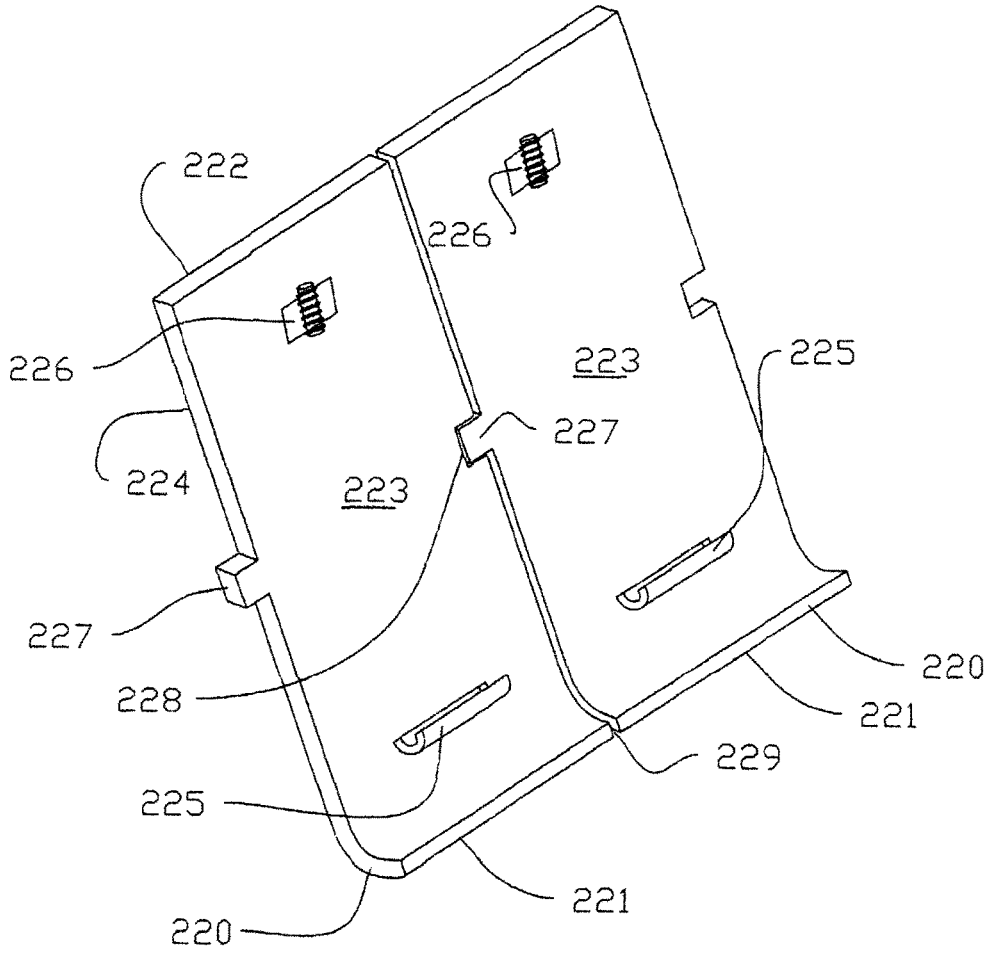
FIG. 11 illustrates an enlarged perspective view of one embodiment of the present invention without a structural/conductor plate, depicting screed top sides of a plurality of modular screed plates aligning and interlocking.

The tensionally yielding gap 129 and 229 respectively, shown in FIGS. 6 and 11, is provided in the present invention, as discussed above, to allow purposely bowing for a crowned paving material 130 (FIG. 1) and 230 (FIG. 8), respectively, or natural bowing in the modular screed plate array 106 and 206 respectively, which will necessarily occur due to the extreme heat applied directly or indirectly in the paving process, in order for the paving material 130 and 230 respectively to become malleable and pliable for easy application on a road surface.

The apparatus assembly and method of the present invention allow for easy wear maintenance of the modular screed plate assembly 100 and 200, with quick changing of the plurality of modular screed plates 120 and 220 respectively. Differing types of paving material 130 and 230, or textures of material may be employed to allow for differing products to be used to create the paving mat or surface, to suit the construction specifications of a particular paving job construction site. Because of the use of the structural/conductor plate 110 in the modular screed plate assembly and method 100 of alternative embodiments the present invention, varying plate materials may be employed to make the plurality of modular screed plates 120 and 220 which are better suited to a particular construction job, which do not require the structural integrity needed with a conventional one screed plate assembly. Examples of the types of plate materials, include: cast nickel hardened, or "Ni-hard", segments for superior wear life, or poly-plastics for paving concrete, or other uniquely textured and high wear materials for the plate materials in other construction applications. The paver under side 102 and 202 commonly used in the industry is made of steel.

Having thus described in detail a preferred selection of embodiments of the present invention, it is to be appreciated, and will be apparent to those skilled in the art, that many physical changes could be made in the device without altering the invention, or the concepts and principles embodied therein. Unless otherwise specifically stated, the terms and expressions have been used herein as terms of description and not terms of limitation, and are not intended to exclude any equivalents of features shown and described or portions thereof. Various changes can, of course, be made to the preferred embodiment without departing from the spirit and scope of the present invention. The present invention apparatus and method, therefore, should not be restricted, except in the following claims and their equivalents.

Although specific advantages have been enumerated above, various embodiments may include some, none, or all of the enumerated advantages.

Other technical advantages may become readily apparent to one of ordinary skill in the art after review of the following figures and description.

It should be understood at the outset that, although exemplary embodiments are illustrated in the figures and described herein, the principles of the present disclosure may be implemented using any number of techniques, whether currently known or not. The present disclosure should in no way be limited to the exemplary implementations and techniques illustrated in the drawings and described herein.

Unless otherwise specifically noted, articles depicted in the drawings are not necessarily drawn to scale.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

We claim:

1. A [modular screed plate assembly] *paving apparatus*, comprising:

(a) a road [paver/finisher] *paver or finisher*;

(b) a [structural/conductor] *structural or conductor* plate, comprising:

(i) a top conductor side and an opposing bottom conductor side, a conductor front side and an opposing conductor backside, a plurality of conductor plate fastening means; and (ii) a plurality of screed plate retaining locks;

(c) the road [paver/finisher] *paver or finisher* comprising: a paver under side, a power source and a heating element, the power source generating and providing at least one of gas heat, hydraulic heat or electricity to the heating element causing the heating element to heat;

(d) the heating element attaching to the top conductor side by a plurality of heating element fastening means and being located between the paver under side and the top conductor side and, immediately against the top conductor side providing direct heat to the [structural/conductor] *structural or conductor* plate;

(e) the plurality of conductor plate fastening means attaching the [structural/conductor] *structural or conductor* plate at its top conductor side to the paver under side of the road [paver/finisher] *paver or finisher*;

(f) a plurality of modular screed plates, each of the plurality of modular screed plates comprising:

(i) a screed *plate* front side and an opposing screed *plate* back side;

(ii) a screed *plate* top side and an opposing screed *plate* bottom side;

(iii) a coupling element being located on the screed *plate* top side proximal to the screed *plate* front side;

(iv) a plurality of retainer [quick-connect/release] *quick-connect or release* means being located on the screed *plate* top side proximal to the opposing screed *plate* back side;

(v) a screed *plate* interlocking side and an opposing screed *plate* receiving side;

(vi) the screed *plate* interlocking side securely, cooperatively, tensionally yielding, and conductively interlocking with the opposing screed *plate* receiving side to an adjacent one of the plurality of modular screed plates;

(vii) the screed *plate* interlocking side and the opposing screed *plate* receiving side interveningly providing a tensionally yielding gap acting as a paving material flow interrupting barrier, where the screed *plate* interlocking side and the opposing screed *plate* receiving side are interlocking; and (viii) the plurality of modular screed plates aligning and interlocking as a modular screed plate array;

(g) each of the plurality of screed plate retaining locks to the [structural/conductor] *structural or conductor* plate securely receiving each of the plurality of retainer [quick-connect/release] *quick-connect or release* means from each of the respective plurality of modular screed plates, and concurrently the conductor front side of the [structural/conductor] *structural or conductor* plate securely and freely receiving the respective coupling element from each of the respective plurality of modular screed plates, the opposing bottom conductor side being in direct contact with the screed *plate* top side;

(h) the modular screed plate array securely and heat-conductively contacting the opposing bottom conductor side of the [structural/conductor] *structural or conductor* plate; and (i) the [structural/conductor] *structural or conductor* plate providing indirect heat to the modular screed plate array.

2. The [modular screed plate assembly] *paving apparatus* of claim 1, wherein the [structural/conductor] *structural or conductor* plate [comprising:] *comprises* a heat conductive material.

3. The [heat conductive material] *paving apparatus* of claim 2 [comprising:], *wherein the heat conductive material comprises*at least one of nickel, copper, aluminum, steel, copper plated steel, copper plated aluminum or metal alloy of copper or nickel.

4. The [modular screed plate assembly] *paving apparatus* of claim 1, wherein the plurality of conductor plate fastening means [comprising:] *comprises* a plurality of threaded nut and bolt fastenings.

5. The [modular screed plate assembly] *paving apparatus* of claim 1, wherein the heating element comprises: at least one electrical heating strip.

[6. The modular screed plate assembly of claim 1 wherein the power source comprising: one of electrical, gas or hydraulic power.]

7. A [modular screed plate assembly] *paving apparatus*, comprising:

(a) a road [paver/finisher] *paver or finisher*;

(b) the road [paver/finisher] *paver or finisher* further comprising: a paver under side, a power source and a heating element, the power source generating and providing electricity to the heating element causing the heating element to heat;

(c) the paver under side having a plurality of screed plate retaining locks; and (d) a plurality of modular screed plates, each of the plurality of modular screed plates comprising:

(i) a screed *plate* front side and an opposing screed *plate* back side;

(ii) a screed *plate* top side and an opposing screed *plate* bottom side;

(iii) a coupling element located on the screed *plate* top side proximal to the screed *plate* front side;

(iv) a plurality of retainer [quick-connect/release] *quick-connect or release* means located on the screed *plate* top side proximal to the opposing screed *plate* back side;

(v) a screed *plate* interlocking side and an opposing screed *plate* receiving side;

(vi) the screed *plate* interlocking side securely, cooperatively, tensionally yielding, and conductively interlocking with the opposing screed *plate* receiving side to an adjacent one of the plurality of modular screed plates;

(vii) the screed *plate* interlocking side and the opposing screed *plate* receiving side interveningly providing a tensionally yielding gap acting as a paving material flow interrupting barrier[, where interlocking]; and (viii) the plurality of modular screed plates aligning and interlocking as a modular screed plate array;

(e) each of the plurality of screed plate retaining locks securely receiving each of the plurality of retainer [quick-connect/release] *quick-connect or release* means from each of the respective plurality of modular screed plates, and concurrently [the paver under side of] the paver under side securely and freely receiving the respective coupling element from each of the respective plurality of modular screed plates;

(f) the modular screed plate array securely and heat-conductively contacting the paver under side; and (g) the heating element being located immediately between and securely against the paver under side and the screed *plate* top side, thereby providing direct heat to the modular screed plate array and the respective plurality of modular screed plates.

8. The [modular screed plate assembly] *paving apparatus* of claim 7, wherein the heating element [comprising:] *comprises* at least one electrical heating strip.

9. The [modular screed plate assembly] *paving apparatus* of claim 7, wherein the power source [comprising:] *comprises* at least one of electrical, gas or hydraulic power.

10. [A screed plate] *An* assembly method, the said method comprising:

(a) having a road [paver/finisher] *paver or finisher* comprising: a paver under side, a power source and a heating element[:]*;*

(b) providing a [structural/conductor] *structural or conductor* plate, comprising:

(i) having a top conductor side and an opposing bottom conductor side, a conductor front side, and a plurality of conductor plate fastening means; and (ii) providing a plurality of screed plate retaining locks;

(c) generating and providing at least one of gas heat, hydraulic heat or electricity from the road [paver/finisher] *paver or finisher* to a heating element causing the heating element to heat;

(d) locating the heating element immediately against the top conductor side;

(e) providing direct heat from the heating element to the [structural/conductor] *structural or conductor* plate from the heating element;

(f) attaching the [structural/conductor] *structural or conductor* plate at its top conductor side to the paver under side of the road [paver/finisher] *paver or finisher* using the plurality of conductor plate fastening means;

(g) providing a plurality of modular screed plates, each of the plurality of modular screed plates comprising:

(i) having a screed *plate* front side and an opposing screed *plate* back side;

(ii) having a screed *plate* top side and an opposing screed *plate* bottom side;

(iii) having a coupling element located on the screed *plate* top side proximal to the screed *plate* front side;

(iv) having a plurality of retainer [quick-connect/release] *quick-connect or release* means located on the screed *plate* top side proximal to the opposing screed *plate* back side;

(v) having a screed *plate* interlocking side and an opposing screed *plate* receiving side;

(vi) securely, cooperatively, tensionally yielding and conductively interlocking the screed *plate* interlocking side to an adjacent one of the plurality of modular screed plates with an opposing screed *plate* receiving side;

(vii) aligning and interlocking the plurality of modular screed plates as a modular screed plate array; [and]

(viii) creating a tensionally yielding gap between the screed interlocking side and the opposing screed *plate* receiving side acting as a paving material flow interrupting barrier; *and*

(ix) using the tensionally yielding gap to allow for a bowing of the modular screed plate array, the bowing resulting from tensional yielding of the modular screed plate array;

(h) securely receiving each of the plurality of retainer [quick-connect/release] *quick-connect or release* means at each of the respective plurality of screed plate retaining locks, and concurrently, securely and freely receiving the respective coupling element at the conductor front side of the [structural/conductor] *structural or conductor* plate, the opposing bottom conductor side being in direct contact with the screed *plate* top side;

(i) securely and conductively contacting the opposing bottom conductor side of the [structural/conductor] *structural or conductor* plate with the modular screed plate array; and (j) providing indirect heat to the modular screed plate array from the heating element and conducting the heat through the [structural/conductor] *structural or conductor* plate.

11. The [screed plate] assembly method of claim 10, wherein the [structural/conductor] *structural or conductor* plate [comprising:] *comprises* a heat conductive material.

12. The [screed plate] assembly method of claim [10] *11*, wherein the heat conductive material [comprising:] *comprises* at least one of nickel, copper, aluminum, steel, copper plated steel, copper plated aluminum or metal alloy of copper or nickel.

13. The [screed plate] assembly method of claim 10, wherein the plurality of conductor plate fastening means [comprising:] *comprises* a plurality of threaded nut and bolt fastenings.

14. The [screed plate] assembly method of claim 10 wherein the heating element [comprising:] *comprises* at least one electrical heating strip.

15. The [screed plate] assembly method of claim 10, wherein the power source [comprising:] *comprises* one of electrical heat, gas heat or hydraulic heat.

16. [A screed plate] *An* assembly method, comprising:

(a) having a road [paver/finisher] *paver or finisher* further comprising: a paver under side, a power source and a heating element;

(b) generating and providing electricity to the heating element from the power source causing the heating element to heat;

(c) having a plurality of screed plate retaining locks on the paver under side; and (d) providing a plurality of modular screed plates, each of the plurality of modular screed plates comprising:

(i) having a screed *plate* front side and an opposing screed *plate* back side;

(ii) having a screed *plate* top side and an opposing screed *plate* bottom side;

(iii) having a coupling element located on the screed *plate* top side proximal to the screed *plate* front side;

(iv) having a plurality of retainer [quick-connect/release] *quick-connect or release* means located on the screed *plate* top side proximal to the opposing screed *plate* back side;

(v) having a screed *plate* interlocking side and an opposing screed *plate* receiving side;

(vi) securely, cooperatively, tensionally yielding, and conductively interlocking the screed *plate* interlocking side to an adjacent one of the plurality of modular screed plates with the opposing screed *plate* receiving side;

(vii) aligning and interlocking as a modular screed plate array the plurality of modular screed plates;

(viii) providing a tensionally yielding gap between the screed *plate* interlocking side and the opposing screed *plate* receiving side acting as a paving material flow interrupting barrier; and (xi) using the tensionally yielding gap to allow for a bowing of the modular screed plate array, the bowing resulting from tensional yielding of the modular screed plate array;

(e) securely receiving each of the plurality of retainer [quick-connect/release] *quick-connect or release* means from each of the respective plurality of screed plate retaining locks to the paver under side, and concurrently, securely and freely receiving the respective coupling element from each of the respective plurality of modular screed plates to the paver under side;

(f) securely and heat-conductively contacting the modular screed plate array with the paver under side; and (g) locating the heating element immediately between and securely against the paver under side and the screed *plate* top side, thereby providing direct heat to the modular screed plate array.

17. The [screed plate] assembly method of claim 16, wherein the heating element [comprising:] *comprises* at least one electrical heating strip.

18. The [screed plate] assembly method of claim 16, wherein the power source [comprising:] *comprises* at least one of electrical heat, gas heat or hydraulic heat.

*19. A road paver comprising:*

*a structural or conductor plate having:*

*a structural or conductor top side;*

*a structural or conductor bottom side opposing the structural or conductor top side;*

*a structural or conductor front side connecting the structural or conductor top side and the structural or conductor bottom side; and*

*a structural or conductor rear side opposing the structural or conductor front side and connecting the structural or conductor top side and the structural or conductor bottom side; and*

*one or more modular screed plates arranged along the structural or conductor bottom side of the structural or conductor plate, each of the one or more modular screed plates including:*

*a paving surface, an attachment surface opposite the paving surface, a front surface, and an opposing rear surface;*

*a first connector having a protruding edge extending from the attachment surface and positioned proximal to the front surface and constructed to be mateable to at least a portion of the road paver via a pressure connection; and*

*a second connector positionable proximal to the rear surface, and configured to cooperate with the first connector to releasably secure the one or more modular screed plates to the at least the portion of the road paver;*

*wherein the first connector is opposite the second connector and the first connector and the second connector are positioned proximal to different surfaces;*

*wherein the paving surface lies below the second connector;*

*wherein the second connector is variably extendable;*

*wherein the first connector has a first angled surface configured to engage and mate with the at least a portion of the structural or conductor front side of the structural or conductor plate, and wherein the second connector has a second angled surface configured to mate with the structural or conductor rear side of the structural or conductor plate.*

*20. The road paver of claim 19, wherein the first connector has a curved or angular configuration.*

*21. The road paver of claim 19, wherein the second connector comprises a threaded bolt.*

*22. The road paver of claim 21, wherein the threaded bolt is arranged so that threads of the threaded bolt extend into the one or more modular screed plates and the structural or conductor plate.*

*23. The road paver of claim 19, wherein the second connector is proximal to the rear surface.*

*24. The road paver of claim 19, further comprising a heating element located proximal to the attachment surface.*

*25. The road paver of claim 24, wherein the heating element is positioned between the first connector and the second connector.*

*26. The road paver of claim 19, further comprising at least one heating element proximal to the structural or conductor top side.*

* * * * *